US012785235B2

(12) United States Patent
Zhang et al.

(10) Patent No.: US 12,785,235 B2
(45) Date of Patent: Nov. 3, 2026

(54) BATTERY CELL, BATTERY AND ELECTRICAL APPARATUS

(71) Applicant: CONTEMPORARY AMPEREX TECHNOLOGY (HONG KONG) LIMITED, Hong Kong (CN)

(72) Inventors: Yanchao Zhang, Ningde (CN); Feng Pan, Ningde (CN); Yuqian Wen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 724 days.

(21) Appl. No.: 18/202,308

(22) Filed: May 26, 2023

(65) Prior Publication Data

US 2023/0327306 A1 Oct. 12, 2023

Related U.S. Application Data

(63) Continuation of application No. PCT/CN2022/098985, filed on Jun. 15, 2022.

(30) Foreign Application Priority Data

Aug. 19, 2021 (CN) ........................ 202121957726.6

(51) Int. Cl.
*H01M 50/645* (2021.01)
*H01M 50/102* (2021.01)
(Continued)

(52) U.S. Cl.
CPC ....... *H01M 50/645* (2021.01); *H01M 50/166* (2021.01); *H01M 50/186* (2021.01); *H01M 50/102* (2021.01)

(58) Field of Classification Search
CPC ............ H01M 50/645; H01M 50/166; H01M 50/186; H01M 50/102
See application file for complete search history.

(56) References Cited

U.S. PATENT DOCUMENTS

2009/0075169 A1* 3/2009 Kim .................... H01M 50/147 429/185
2010/0304214 A1* 12/2010 Itoh .................... H01M 50/186 429/185
(Continued)

FOREIGN PATENT DOCUMENTS

CN 102035042 A 4/2011
CN 107359304 A 11/2017
(Continued)

OTHER PUBLICATIONS

English Translation of JP 2014175143A—Sealing structure and sealing method for liquid intake port of sealed secondary battery; Nippon Pop RIvets and Fasteners; Sep. 22, 2014 (Year: 2014).*
(Continued)

*Primary Examiner* — Adam J Francis
(74) *Attorney, Agent, or Firm* — XSENSUS LLP

(57) ABSTRACT

A battery cell may comprise: a case having an opening; an end cover assembly for closing the opening, wherein the end cover assembly may be provided with a liquid injection hole, and the liquid injection hole may comprise a first hole segment; a rivet, comprising a nail cap and a nail body, wherein the nail body may pass through the first hole segment, and the nail cap may be located on the side of the first hole segment away from the interior of the case; and a sealer, disposed between the nail cap and the end cover assembly, for sealing the first hole segment.

10 Claims, 7 Drawing Sheets

1000

(51) Int. Cl.

| | |
|---|---|
| ***H01M 50/166*** | (2021.01) |
| ***H01M 50/186*** | (2021.01) |

(56) References Cited

U.S. PATENT DOCUMENTS

| | | | | |
|---|---|---|---|---|
| 2011/0072648 A1* | 3/2011 | Yamauchi | H01M 10/04 |
| | | | 29/623.2 |
| 2015/0132619 A1* | 5/2015 | He | H01M 50/147 |
| | | | 429/53 |

FOREIGN PATENT DOCUMENTS

| | | | | |
|---|---|---|---|---|
| CN | 208256801 | U | * | 12/2018 |
| CN | 111490192 | A | | 8/2020 |
| CN | 112332044 | A | | 2/2021 |
| CN | 214280081 | U | | 9/2021 |
| CN | 215988964 | U | | 3/2022 |
| CN | 216354673 | U | | 4/2022 |
| JP | 2013-089359 | A | | 5/2013 |
| JP | 2014-120389 | A | | 6/2014 |
| JP | 2014175143 | A | * | 9/2014 |
| JP | 2015-153502 | A | | 8/2015 |

OTHER PUBLICATIONS

English Translation of CN 208256801 U-Square Lithium battery electrolyte solutions annotates liquid hole seal structure—Hefei Guoxuan High Tech Power Energy Co LTD; Dec. 18, 2018 (Year: 2018).*

Extended European Search Report issued Aug. 20, 2024 in European Patent Application No. 22857401.8.

Notice of Grant of Utility Model Patent issued Jan. 6, 2022 in Chinese Patent Application No. 202121957726.6 with English translation thereof.

International Search Report and Written Opinion mailed on Aug. 31, 2022, received for PCT Application PCT/CN2022/098985, filed on Jun. 15, 2022, 14 pages including English Translation.

* cited by examiner

BATTERY CELL, BATTERY AND ELECTRICAL APPARATUS

CROSS-REFERENCE TO RELATED APPLICATIONS

The present application is a continuation of International Application No. PCT/CN2022/098985, filed on Jun. 15, 2022, which claims the priority of Chinese Patent Application No. 202121957726.6 filed on Aug. 19, 2021 and entitled "BATTERY CELL, BATTERY AND ELECTRICAL APPARATUS" the entire content of which is incorporated herein by reference.

TECHNICAL FIELD

The present application relates to the technical field of battery manufacturing, and in particular, to a battery cell, a battery, and an electrical apparatus.

BACKGROUND ART

Energy saving and emission reduction is the key to sustainable development of the automobile industry. In this case, electric vehicles have become an important part of the sustainable development of the automobile industry because of their advantages of energy saving and environmental protection. For electric vehicles, battery technology is an important factor related to their development.

In the development of the battery technologies, safety is also a non-negligible issue in addition to improvement of performance of the batteries. How to enhance the safety of the batteries is an urgent technical problem to be solved in the battery technologies.

SUMMARY OF THE DISCLOSURE

An object of the present application is to provide a battery cell, a battery, and an electrical apparatus, which can enhance the safety of the battery.

The present application is implemented by using the following technical solutions:

In a first aspect, the present application provides a battery cell, including:

- a case having an opening;
- an end cover assembly for closing the opening, wherein the end cover assembly is provided with a liquid injection hole, and the liquid injection hole includes a first hole segment;
- a rivet comprising a nail cap and a nail body, wherein the nail body passes through the first hole segment, and the nail cap is located on the side of the first hole segment away from the interior of the case; and
- a sealing member or sealer, arranged between the nail cap and the end cover assembly, for sealing the first hole segment;
- wherein a position-limit boss is formed on the side of the nail cap close to the first hole segment, and the position-limit boss is used for abutting against the end cover assembly to limit the compression amount of the sealing member; or, a position-limit boss is formed on the end cover assembly, and the position-limit boss abuts against the side of the nail cap close to the first hole segment to limit the compression amount of the sealing member.

According to the battery cell of the embodiment of the present application, by forming a position-limit boss on the side of the nail cap close to the first hole segment, the position-limit boss abuts against the end cover assembly, or by forming a position-limit boss on the end cover assembly, the position-limit boss abuts against the side of the nail cap close to the first hole segment; during riveting, the position-limit boss can achieve the effect of limiting the compression amount of the sealing member, adjusting the mounting error caused by the inclination of the nail body, and ensuring the sealing fit between the nail cap and the end cover assembly; when it is ensured that the nail body is not inclined, compression amounts at different positions of the sealing member are ensured to be consistent, and long-term sealing performance is improved. The battery cell, based on the sealing fit between the nail cap and the end cover assembly, can reduce the risk of leakage of the electrolyte solution in the case from the liquid injection hole, so as to avoid potential safety hazards and improve safety.

According to some embodiments of the present application, the height of the position-limit boss is less than the original thickness of the sealing member.

In the above solution, the height of the position-limit boss is less than the original thickness of the sealing member, so that the nail cap and the end cover assembly cooperate to compress the sealing member, which deforms the sealing member to further fill a gap between the nail cap and the end cover assembly, thereby blocking a gap between the nail body and the first hole segment, and ensuring the sealing effect of the battery cell.

According to some embodiments of the present application, the position-limit boss is disposed around the sealing member.

In the above solution, the position-limit boss is arranged around the sealing member, so that the position-limit boss can support the nail cap at different positions in the circumferential direction of the sealing member, prevent the nail cap from being inclined, so as to control the compression amount of the sealing member, ensure that the compression amounts at different positions of the sealing member are consistent, and ensure the sealing effect between the nail cap and the end cover assembly.

According to some embodiments of the present application, the position-limit boss is an annular boss disposed around the central axis of the rivet; or, the position-limit boss includes a plurality of sub-bosses distributed at intervals around the central axis of the rivet.

In the above solution, in the embodiment where the position-limit boss is an annular boss disposed around the central axis of the rivet, the position-limit boss can achieve the effect of supporting at any position in the circumferential direction of the rivet, so as to prevent the nail cap from being inclined, and control the compression amount of the sealing member, thereby ensuring that the compression amounts at different positions of the sealing member are consistent. In the embodiment where the position-limit boss includes a plurality of sub-bosses distributed at intervals around the central axis of the rivet, the plurality of sub-bosses can have a plurality of supporting positions in the circumferential direction of the rivet to prevent the nail cap from being inclined, so as to facilitate the control of the compression amount of the sealing member, and ensure that the compression amounts at different positions of the sealing member are consistent.

According to some embodiments of the present application, the position-limit boss is formed at the edge of the nail cap.

In the above solution, the position-limit boss being located at the edge of the nail cap, compared with the position-limit boss being disposed at other position of the nail cap close to the central axis of the rivet, can make the nail cap and the sealing member have a large contact area, which facilitates the control of the compression amount of the sealing member, and ensures the sealing effect between the nail cap and the end cover assembly.

According to some embodiments of the present application, the end cover assembly includes an end cover and an electrode terminal, the end cover covers the opening, the electrode terminal is disposed on the end cover, and the liquid injection hole is disposed on the end cover or the electrode terminal.

In the above solution, the liquid injection hole may be disposed on the end cover, or may be disposed on the electrode terminal; in the embodiment where the liquid injection hole is disposed on the end cover, the liquid injection hole may be disposed at any suitable position of the end cover, and there are many positions for selection, as long as the liquid injection hole does not interfere with other components; in the embodiment where the liquid injection hole is disposed on the electrode terminal, the thickness of the electrode terminal is greater than the thickness of the end cover, which can provide good support for riveting of the rivet, so as to facilitate riveting operation.

According to some embodiments of the present application, the liquid injection hole further includes a second hole segment in communication with the first hole segment, the second hole segment is located on the side of the first hole segment away from the interior of the case, the battery cell further includes a sealing nail, and the sealing nail is in sealing fit with the second hole segment.

In the above solution, the second hole segment is located on the side of the first hole segment away from the interior of the case, so as to avoid occupying the internal space of the case; the sealing effect is further improved by means of the sealing fit between the sealing nail and the second hole segment.

According to some embodiments of the present application, the liquid injection hole is disposed on the end cover, and the side of the sealing nail away from the interior of the case does not exceed the side of the end cover away from the interior of the case;

or, the liquid injection hole is disposed on the electrode terminal, and the side of the sealing nail away from the interior of the case does not exceed the side of the electrode terminal away from the interior of the case.

In the above solution, in the embodiment where the liquid injection hole is disposed on the end cover, the surface of the sealing nail is flush with the surface of the end cover, so that the appearance of the battery cell is beautiful, and the sealing nail is prevented from protruding from the surface of the end cover and interfering with other components. In the embodiment where the liquid injection hole is disposed on the electrode terminal, the surface of the sealing nail is flush with the surface of the electrode terminal, so that the appearance of the battery cell is beautiful, and the sealing nail is prevented from protruding from the surface of the end cover and interfering with other components.

According to some embodiments of the present application, the liquid injection hole further includes a third hole segment in communication with the first hole segment, the third hole segment is located on the side of the first hole segment close to the interior of the case, and the end of the nail body away from the nail cap is located in the third hole segment and does not exceed the third hole segment.

In the above solution, the third hole segment is located on the side of the first hole segment close to the interior of the case, that is, the third hole segment is closer to the electrode assembly than the first hole segment, and the end of the nail body away from the nail cap is located in the third hole segment and does not exceed the third hole segment, so as to avoid occupying the internal space of the case, thereby improving the energy density of the battery cell.

In a second aspect, an embodiment of the present application further provides a battery, including the above battery cell.

In a third aspect, an embodiment of the present application further provides an electrical apparatus, including the above battery, where the battery is used for providing electric energy.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the embodiments of the present application more clearly, the drawings required in the embodiments of the present application will be briefly introduced below. Obviously, the drawings described below are only some embodiments of the present application. For those of ordinary skill in the art, other drawings can also be obtained according to the drawings without any creative effort.

Figure 1:
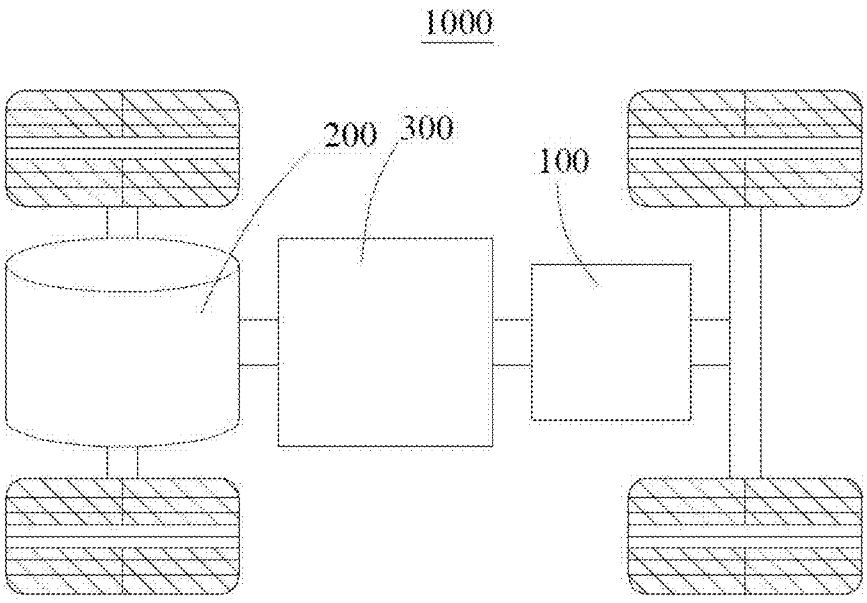
FIG. 1 is a schematic structural diagram of a vehicle provided by some embodiments of the present application.

In the drawings, the drawings are not drawn to actual scale.

Description of reference numerals: 100—battery; 101—box body; 1011—first portion; 1012—second portion; 10—battery cell; 11—case; 111—opening; 12—end cover assembly; 120—liquid injection hole; 1201—first hole segment; 1202—second hole segment; 1203—third hole segment; 1204—first stepped surface; 1205—step; 121—end cover; 122—electrode terminal; 13—rivet; 131—nail cap; 132—nail body; 1321—limiting structure; 133—pull rod; 14—sealing member; 15—position-limit boss; 151—sub-boss; 152—notch; 16—electrode assembly; 17—sealing nail; 200—motor; 300—controller; 1000—vehicle.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" means two or more (including two). By the same reasoning, the term "a plurality of groups" means two or more (including two groups), and the term "a plurality of pieces" means two or more (including two pieces).

In the description of the embodiments of the present application, the orientation or positional relationship indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. is based on the orientation or positional relationship shown in the drawings, and is merely intended to describe the embodiments of the present application and simplify the description, rather than indicating or suggesting that the indicated apparatus or element must have a specific orientation, be constructed and operated in a specific orientation, and therefore cannot be understood as limiting the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

The battery mentioned in the present application refers to a single physical module that includes one or more battery cells to provide higher voltage and capacity. For example, the battery mentioned in the present application may include a battery module, a battery pack, or the like.

In the present application, battery cells may include a lithium-ion secondary battery, a lithium-ion primary battery, a lithium-sulfur battery, a sodium/lithium-ion battery, a sodium-ion battery, or a magnesium-ion battery, etc., which is not limited in the examples of the present application. The battery cell may be cylindrical, flat, rectangular, or in other shapes, which is also not limited in the embodiments of the present application. The battery cells are generally classified into three types depending on the way of package: cylindrical battery cells, prismatic battery cells, and pouch battery cells. The embodiments of the present application are not limited thereto.

The battery mentioned in the embodiments of the present application refers to a single physical module including one or more battery cells to provide a higher voltage and capacity. For example, the battery mentioned in the present application may include a battery module, a battery pack, or the like. The battery generally includes a box body for encapsulating one or more battery cells. The box body can prevent liquids or other foreign matters from affecting the charging or discharging of the battery cells.

The battery cell includes an electrode assembly and an electrolyte solution, and the electrode assembly is composed of a positive electrode sheet, a negative electrode sheet and a separator. The battery cells work mainly relying on the movement of metal ions between the positive electrode sheet and the negative electrode sheet. The positive electrode sheet includes a positive electrode current collector and a positive electrode active material layer. A surface of the positive electrode current collector is coated with the positive electrode active material layer. Current collectors not coated with the positive electrode active material layer protrude from the current collector coated with the positive electrode active material layer. The current collectors not coated with the positive electrode active material layer serve as positive electrode tabs. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet includes a negative electrode current collector and a negative electrode active material layer. A surface of the negative electrode current collector is coated with the negative electrode active material layer. Current collectors not coated with the negative electrode active material layer protrude from the current collector coated with the negative electrode active material layer. The current collectors not coated with the negative electrode active material layer serve as negative electrode tabs. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A separator may be made from polypropylene (PP), polyethylene (PE), or the like. In addition, the electrode assembly may be of a wound structure or a laminated structure, which is not limited in the embodiments of the present application.

The battery cell further includes a case and an end cover assembly, where the case has an opening for placing the electrode assembly into the case, and the end cover assembly is used for closing the opening to connect with the case to form a cavity for accommodating the electrode assembly. Generally, the interior of the case needs to be filled with an electrolyte solution, and the end cover assembly is provided with a liquid injection hole for the electrolyte solution to enter the interior of the case.

In the production process of the battery, whether the electrolyte solution leaks or not is affected by the sealing effect of the liquid injection hole, and if the sealing effect of the liquid injection hole is poor, the electrolyte solution is more likely to leak, thereby causing safety hazards and affecting the safety of the battery.

In the prior art, a fitting manner of a rivet and a sealing member is usually used to seal the liquid injection hole. The inventor have found that in the process of riveting, the mounting precision of the rivet would affect the sealing effect of the liquid injection hole, and if the nail body is inclined, the extrusion pressure applied to the sealing member by the nail cap is not balanced, which causes the compression amounts at different positions of the sealing member to be inconsistent, and the sealing member cannot completely close the gap between the liquid injection hole and the nail body, which in turn causes failure of the seal, the electrolyte solution is more likely to leak, thus affecting the safety of the battery.

Based on the above consideration, in order to solve the problem that the sealing effect of the liquid injection hole is poor, after intensive research, the inventor designs a battery cell, the battery cell comprising a case, an end cover assembly, a rivet and a sealing member; the case has an opening, the end cover assembly is used for closing the opening, the end cover assembly is provided with a liquid injection hole, and the liquid injection hole comprises a first hole segment; the rivet comprises a nail cap and a nail body, the nail body passes through the first hole segment, and the nail cap is located on the side of the first hole segment away from the interior of the case; the sealing member is disposed between the nail cap and the end cover assembly for sealing the first hole segment. wherein a position-limit boss is formed on the side of the nail cap close to the first hole segment, and the position-limit boss is used for abutting against the end cover assembly to limit the compression amount of the sealing member; or, a position-limit boss is formed on the end cover assembly, and the position-limit boss is abutting against the side of the nail cap close to the first hole segment to limit the compression amount of the sealing member.

In such battery cell, in the embodiment where the position-limit boss is formed on the side of the nail cap close to the first hole segment, the position-limit boss abuts against the end cover assembly, or in the embodiment where the position-limit boss is formed on the end cover assembly, the position-limit boss abuts against the side of the nail cap close to the first hole segment; when the rivet is riveted to the end cover assembly, the position-limit boss can achieve the effect of limiting the compression amount of the sealing member, adjusting the mounting error caused by the inclination of the nail body, and ensuring the sealing fit between the nail cap and the end cover assembly; when it is ensured that the nail body is not inclined, the force applied by the nail cap to different positions of the sealing member is balanced, so as to ensure that the compression amounts at different positions of the sealing member are consistent, thereby improving long-term sealing performance.

Due to the sealing fit between the nail cap and the end cover assembly, there is a good sealing effect between the nail cap and the end cover assembly, which can effectively reduce the risk of leakage of the electrolyte solution in the case from the liquid injection hole, so as to avoid potential safety hazards and improve safety.

The battery cell disclosed in the embodiments of the present application may be used, but is not limited to, in an electrical apparatus such as a vehicle, a ship, or an aircraft. A power supply system of the electrical apparatus can be composed with the battery cells, batteries, and the like disclosed in the present application.

Embodiments of the present application provide an electrical apparatus that uses a battery as a power supply, the electrical apparatus may be, but is not limited to, a mobile phone, a tablet computer, a laptop, an electric toy, an electric tool, an electric bicycle, an electric motorcycle, an electric vehicle, a ship, a spacecraft, or the like. wherein the electric toy may include fixed or mobile electric toys, such as game consoles, electric car toys, electric ship toys, electric airplane toys, and the like. The spacecraft may include airplanes, rockets, space shuttles, spaceships, and the like.

It should be understood that the technical solutions described in the embodiments of the present application are not limited to the apparatus described above, but may be applied to all apparatus that use a battery. However, for the sake of brevity, for example, the following embodiments are described with the electrical apparatus as a vehicle.

Please refer to FIG. 1, which is a schematic structural diagram of a vehicle 1000 according to some embodiments of the present application. The vehicle 1000 may be a fuel vehicle, a gas vehicle, or a new energy vehicle, and the new energy vehicle may be an all-electric vehicle, a hybrid electric vehicle, an extended range electric vehicle, or the like. A battery 100 is provided inside the vehicle 1000, and the battery 100 may be provided at the bottom or head or rear of the vehicle 1000. The battery 100 may be configured to supply power to the vehicle 1000. For example, the battery 100 may be used as an operating power source of the vehicle 1000, which is used for a circuit system of the vehicle 1000, for example, for operating power demand during starting, navigating, and running of the vehicle 1000.

A motor 200 and a controller 300 may be disposed in the vehicle 1000. The controller 300 is configured to control the battery 100 to power the motor 200. For example, for the operating power demand when the vehicle 1000 is starting, navigating and driving.

In another embodiment of the present application, the battery 100 may not only be used as an operating power source of the vehicle 1000, but may also be used as a driving power source of the vehicle 1000 to provide driving power for vehicle 1000 instead of or partially instead of fuel or natural gas.

Figure 2:
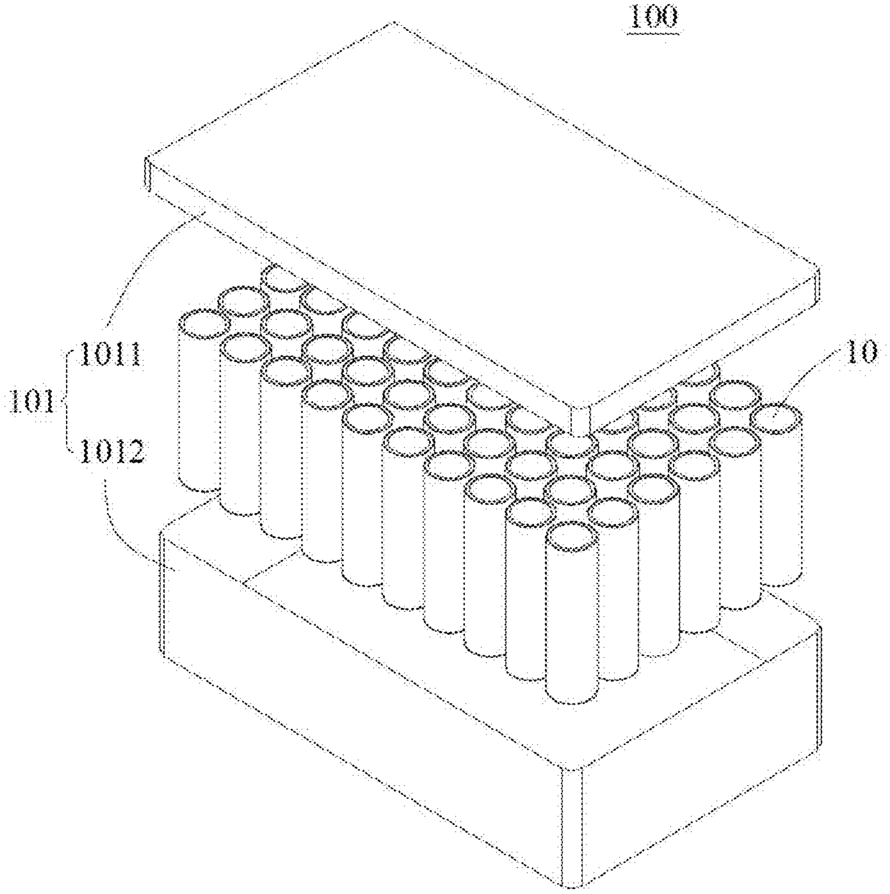
FIG. 2 is an exploded view of a battery provided by some embodiments of the present application.

Please refer to FIG. 2, which is an exploded view of a battery 100 according to some embodiments of the present application. The battery 100 includes a box body 101 and a battery cell 10, and the battery cell 10 is accommodated in the box body 101.

Here, the box body 101 is used to provide an accommodating space for the battery cell 10, and the box body 101 can be of various structures. In some embodiments, the box body 101 may include a first portion 1011 and a second portion 1012, the first portion 1011 and the second portion 1012 are covered with each other, and the first portion 1011 and the second portion 1012 together define an accommodation space for accommodating the battery cell 10. The second portion 1012 may be a hollow structure with one end open, the first portion 1011 may be a plate-like structure, and the first portion 1011 covers the opening side of the second portion 1012, so that the first portion 1011 and the second portion 1012 together define the accommodating space; both of the first portion 1011 and the second portion 1012 may also be a hollow structure with one side open, and the opening side of the first portion 1011 covers the opening side of the second portion 1012. Of course, the box body 101 formed by the first portion 1011 and the second portion 1012 can be of various shapes, such as a cylinder, a cuboid, etc.

In the battery 100, there may be a plurality of battery cells 10, and the plurality of battery cells 10 can be connected in series or parallel or in parallel-series connection, wherein the parallel-series connection means that the plurality of battery cells 10 are connected in both series and parallel. The plurality of battery cells 10 may be directly connected in series or in parallel or in parallel-series connection, and then the whole of the plurality of battery cells 10 may be accommodated in the box body 101; of course, the battery 100 may also be a plurality of battery cells 10 being first connected in series or parallel or in parallel-series connection to form a battery 100 module, and then a plurality of battery 100 modules are connected in series or parallel or in parallel-series connection to form a whole and is accommodated in the box body 101.

The battery 100 may further include other structures, for example, the battery 100 may further include a confluence component for electrically connecting a plurality of battery cells 10.

wherein each battery cell 10 may be a secondary battery or a primary battery; or may be a lithium-sulfur battery, a sodium-ion battery or a magnesium-ion battery, but is not limited thereto. The battery cell 10 may be in the shape of a cylinder, a flat body, a cuboid or others. For ease of description, the following embodiments of the present application are described by using an example in which the battery cell 10 is cylindrical.

Figure 3:
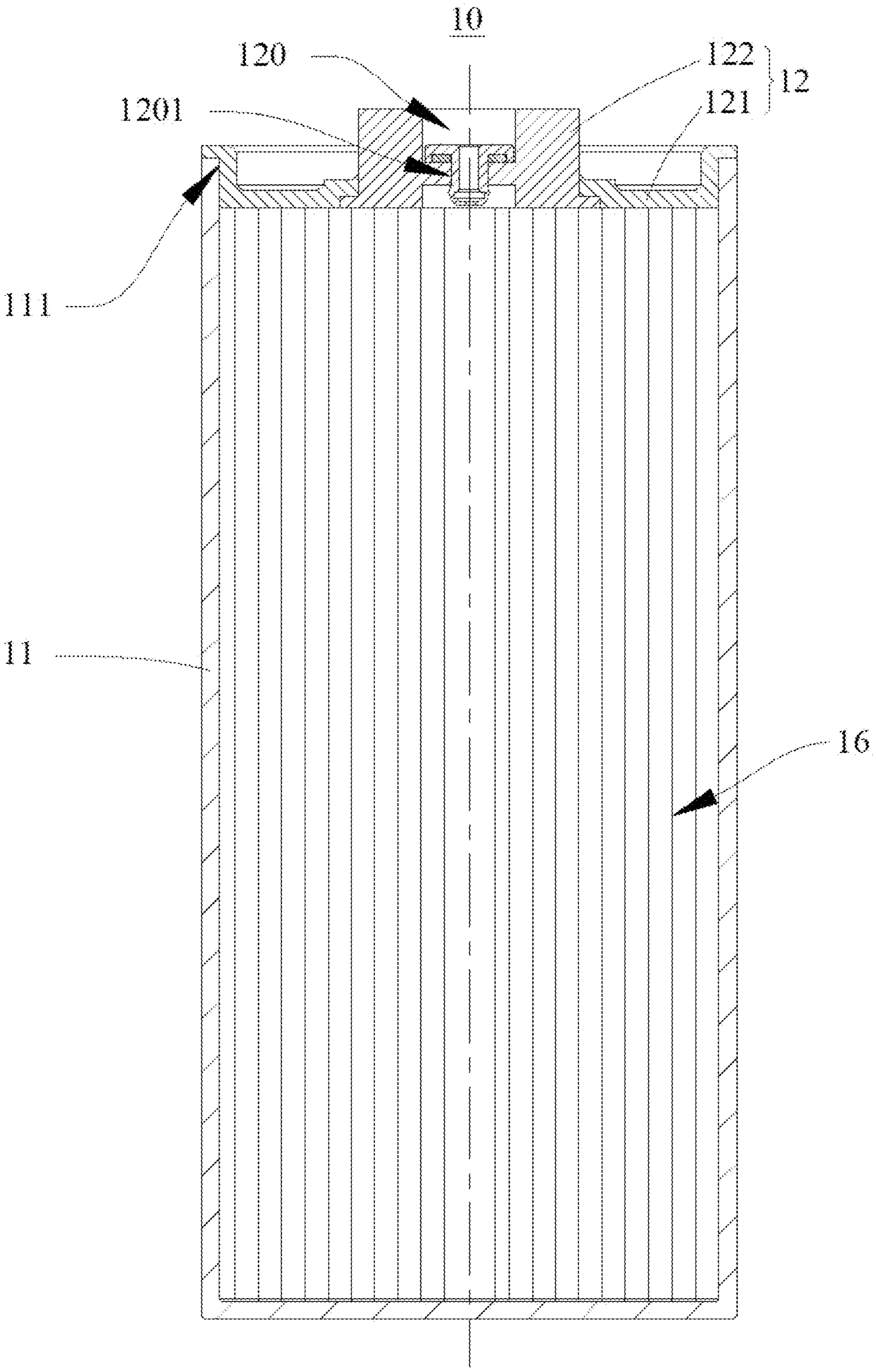
FIG. 3 is a schematic structural diagram of a battery cell provided by some embodiments of the present application.
Figure 4:
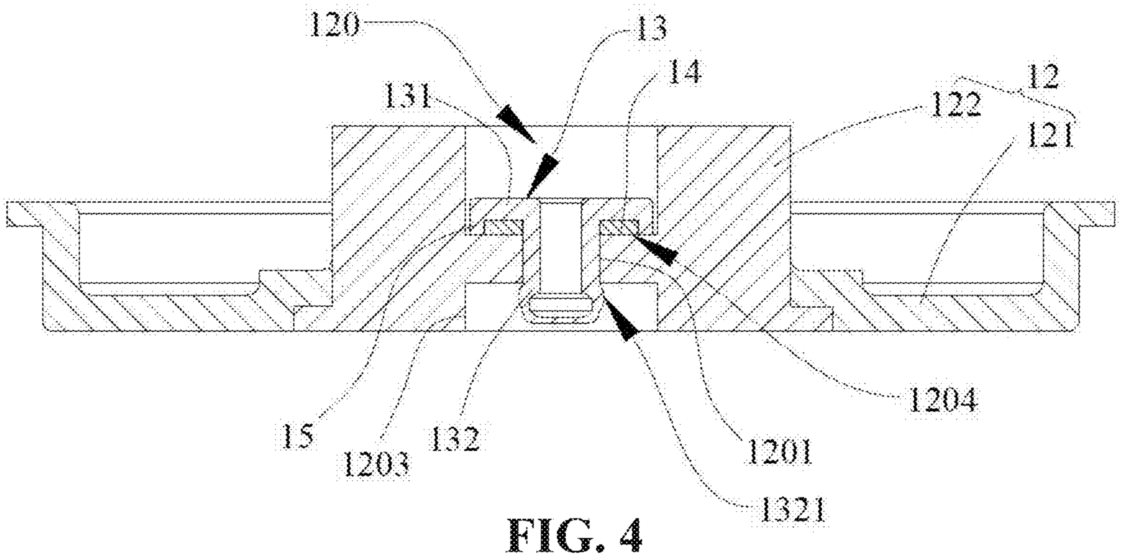
FIG. 4 is a schematic structural diagram of the end cover assembly in FIG. 3.

Please refer to FIGS. 3 and 4, FIG. 3 is a schematic structural diagram of a battery cell provided by some embodiments of the present application. FIG. 4 is a schematic structural diagram of an end cover assembly 12 in FIG. 3. The battery cell 10 refers to a minimum unit constituting the battery 100. As shown in FIG. 3, the battery cell 10 includes a case 11, an end cover assembly 12, an electrode assembly 16, and other functional components.

The case 11 has an opening for placing the electrode assembly 16 into the case 11. The case 11 is an assembly for fitting with the end cover assembly 12 to form an internal environment of the battery cell 10, wherein the formed internal environment may be used to accommodate the electrode assembly 16, the electrolyte solution, and other components. The case 11 may be of a variety of shapes and sizes, for example, a rectangular parallelepiped shape, a cylindrical shape, a hexagonal prism shape, and the like. In the embodiments of the present application, for example, the case 11 is of a cylindrical shape. The case 11 may be made of various materials, such as copper, iron, aluminum, stainless steel, aluminum alloy, plastic, or the like. In the embodiments of the present application, for example, the material of the case 11 is aluminum alloy.

As shown in FIG. 4, the end cover assembly 12 includes an end cover 121 and an electrode terminal 122, the electrode terminal 122 is disposed on the end cover 121. The end cover 121 refers to a component that covers the opening of the case 11 to isolate the internal environment of the battery 100 from the external environment thereof. Without being limited, the shape of the end cover 121 may be adapted to the shape of the case 11 to fit the case 11. Optionally, the end cover 121 may be made of a material with certain hardness and strength (such as aluminum alloy). In this way, the end cover 121 is less likely to deform when subjected to extrusion and collision, so that the battery cell 10 can have a higher structural strength, and safety performance can also be improved. The electrode terminal 122 may be used for electrical connection with the electrode assembly 16 for output or input of electrical energy from or to the battery cell 10. In some embodiments, the end cover 121 may be further provided with a pressure relief mechanism for releasing the internal pressure when the internal pressure or temperature of the battery cell 10 reaches a threshold. The end cover 121 may also be made of various materials, such as copper, iron, aluminum, stainless steel, aluminum alloy, plastic, or the like. In the embodiments of the present application, for example, the material of the end cover 121 is aluminum alloy.

The electrode assembly 16 is a component in which an electrochemical reaction occurs in the battery cell 10. One or more electrode assemblies 16 may be included in the case 11. The electrode assembly 16 is mainly formed by winding or stacking a positive electrode sheet and a negative electrode sheet, and a separator is usually provided between the positive electrode sheet and the negative electrode sheet. The portions of the positive electrode sheet and the negative electrode sheet having an active material constitute the main body of the electrode assembly 16, and the portions of the positive electrode sheet and the negative electrode sheet without an active material constitute electrode tabs thereof respectively. The positive electrode tab and the negative electrode tab may be located at one end of the main body together or at both ends of the main body respectively. During the charging and discharging process of the battery 100, the positive electrode active material and the negative electrode active material react with the electrolyte solution, and the tabs are connected to the electrode terminal 122 to form a current loop.

According to some embodiments of the present application, a battery cell 10 is provided. As shown in FIG. 3 and FIG. 4, the battery cell 10 includes a case 11, an end cover assembly 12, a rivet 13, and a sealing member 14. The case 11 has an opening 111. The end cover assembly 12 is used for closing the opening 111, the end cover assembly 12 is provided with a liquid injection hole 120, and the liquid injection hole 120 includes a first hole segment 1201. The rivet 13 includes a nail cap 131 and a nail body 132, the nail body 132 passes through the first hole segment 1201, and the nail cap 131 is located on the side of the first hole segment 1201 away from the interior of the case 11. The sealing member 14 is disposed between the nail cap 131 and the end cover assembly 12, and the sealing member 14 is used for sealing the first hole segment 1201. A position-limit boss 15 is formed on the side of the nail cap 131 close to the first hole segment 1201, and the position-limit boss 15 is used for abutting against the end cover assembly 12 to limit the compression amount of the sealing member 14; or, a position-limit boss 15 is formed on the end cover assembly 12, and the position-limit boss 15 abuts against the side of the nail cap 131 close to the first hole segment 1201 to limit the compression amount of the sealing member 14.

It should be noted that, the interior of the case 11 refers to the area enclosed by the case 11 and the end cover assembly 12 after the end cover assembly 12 encapsulates the opening 111 of the case 11. The end cover assembly 12 is provided with a liquid injection hole 120, the liquid injection hole 120 communicates with the internal and the external space of the case 11 to facilitate the flow of electrolyte solution into the interior of the case 11 via the liquid injection hole 120.

As shown in FIG. 4, a first stepped surface 1204 is formed on the end cover assembly 12, and the first stepped surface 1204 is located on the side of the first hole segment 1201 away from the interior of the case 11, that is, the first hole segment 1201 is opened on the first stepped surface 1204. The sealing member 14 is disposed on the first stepped surface 1204, and the sealing member 14 is clamped by the first stepped surface 1204 and the nail cap 131.

Figure 5:
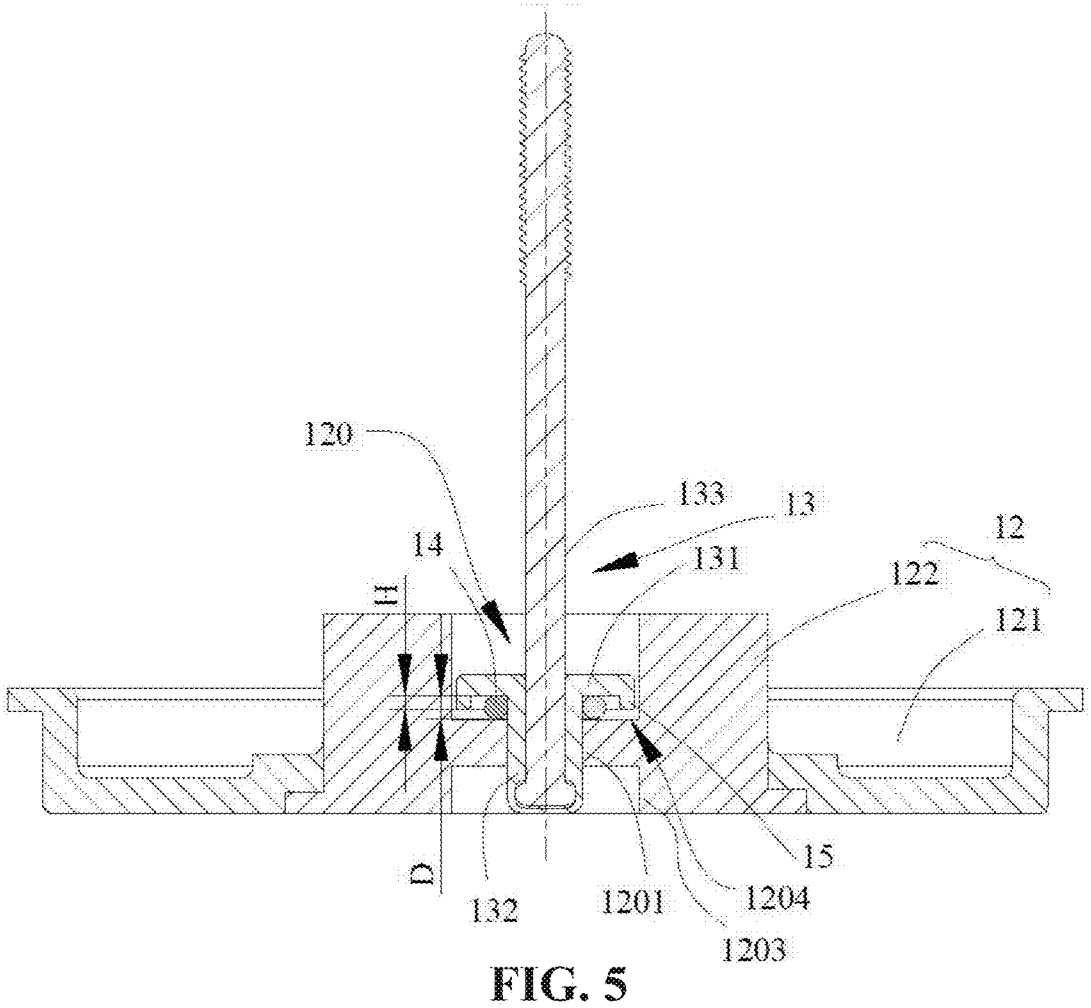
FIG. 5 is a schematic assembly diagram provided by some embodiments of the present application before a rivet is riveted to an end cover assembly.

The nail body 132 passing through the first hole segment 1201 means that one end of the nail body 132 is connected with the nail cap 131, the nail cap 131 is located on the side of the first hole segment 1201 away from the interior of the case 11, and the other end of the nail body 132 is located on the side of the first hole segment 1201 close to the interior of the case 11 after passing through the first hole segment 1201. The material of the rivet 13 may be aluminum, stainless steel, iron, brass, and red copper, etc. Please refer to FIG. 5, FIG. 5 is a schematic assembly diagram provided by some embodiments of the present application before a rivet 13 is riveted to an end cover assembly 12; As shown in FIG. 5, the rivet 13 generally further includes a pull rod 133. During riveting, the pull rod 133 of the rivet 13 is clamped by an external component and pulled out from the nail cap 131 and the nail body 132, so as to fix the nail cap 131 and the nail body 132 to the end cover assembly 12, this riveting operation is referred to as pull riveting operation. During the pull riveting operation, one end of the nail body 132 away from the nail cap 131 is deformed under the action of the pull rod 133 to form a limiting structure 1321, the nail body 132 and the end cover assembly 12 are fixed by the nail cap 131 and the limiting structure 1321. During the riveting process, the nail cap 131 is applied with the force for pressing the sealing member 14 to compress and deform the sealing member 14, and after the nail cap 131 and the nail body 132 are fitted and fixed to the end cover assembly 12, the sealing member 14 is pressed against the end cover assembly 12 by the nail cap 131, thereby forming a seal between the nail cap 131 and the end cover assembly 12.

In the embodiment where the position-limit boss 15 is formed on the side of the nail cap 131 close to the first hole segment 1201, as shown in FIG. 4, the position-limit boss 15 abuts against the end cover assembly 12 (the first stepped surface 1204), or, in the embodiment where the position-limit boss 15 is formed on the end cover assembly 12, the position-limit boss 15 abuts against the side of the nail cap 131 close to the first hole segment 1201; when the rivet 13 is riveted to the end cover assembly 12, the position-limit boss 15 can achieve the effect of limiting the compression amount of the sealing member 14, adjusting the mounting error caused by the inclination of the nail body 132, and ensuring the sealing fit between the nail cap 131 and the end cover assembly 12; when it is ensured that the nail body 132 is not inclined, the force applied by the nail cap 131 to different positions of the sealing member 14 is balanced, so as to ensure that the compression amounts at different positions of the sealing member 14 are consistent, thereby improving long-term sealing performance.

Due to the sealing fit between the nail cap 131 and the end cover assembly 12, there is a good sealing effect between the nail cap 131 and the end cover assembly 12, which can effectively reduce the risk of leakage of the electrolyte solution in the case 11 from the liquid injection hole 120, so as to avoid safety hazards and improve safety.

According to some embodiments of the present application, optionally, referring to FIG. 5, the height H of the position-limit boss 15 is less than the original thickness D of the sealing member 14.

The original thickness D of the sealing member 14 refers to the thickness of the sealing member 14 before the riveting operation; the height H of the position-limit boss 15 refers to the size of the position-limit boss 15 in the direction along the central axis of the rivet 13, that is, the size of the position-limit boss 15 in the direction along the central axis of the first hole segment 1201. Before the riveting operation, the height H of the position-limit boss 15 is less than the original thickness D of the sealing member 14. In the embodiment where the position-limit boss 15 is formed on the side of the nail cap 131 close to the first hole segment 1201, as shown in FIG. 5, before the riveting operation, the two sides of the sealing member 14 in the thickness direction are respectively in contact with the nail cap 131 and the end cover assembly 12 (the first stepped surface 1204), and there is a gap between the surface of the side of the position-limit boss close to the first hole segment 1201 and the end cover assembly 12 (the first stepped surface 1204); during the riveting process, the nail cap 131 moves towards the first hole segment 1201, and moves until the position-limit boss 15 abuts against the end cover assembly 12 (the first stepped surface 1204). During the movement of the nail cap 131, the nail cap 131 presses the sealing member 14, the sealing member 14 is gradually compressed and deformed, and the thickness of the sealing member 14 in the final state is reduced to be the same as the height D of the position-limit boss 15. Likewise, in the embodiment where the position-limit boss 15 is formed on the end cover assembly 12, before the riveting operation, the two sides of the sealing member 14 in the thickness direction are respectively in contact with the nail cap 131 and the end cover assembly 12 (the first stepped surface 1204), and there is a gap between the surface of one end of the position-limit boss 15 facing the nail cap 131 and the nail cap 131; during the riveting process, the nail cap 131 moves towards the first hole segment 1201 and moves until the nail cap 131 abuts against the position-limit boss 15. During the movement of the nail cap 131, the sealing member 14 is gradually compressed and deformed, and the thickness of the sealing member 14 in the final state is reduced to be the same as the height D of the position-limit boss 15.

The height H of the position-limit boss 15 is less than the original thickness D of the sealing member 14, so that the nail cap 131 and the end cover assembly 12 cooperate to compress the sealing member 14, and the sealing member 14 is deformed to further fill the gap between the nail cap 131 and the end cover assembly 12, thereby blocking the gap between the nail body 132 and the first hole segment 1201, and ensuring the sealing effect of the battery cell 10.

According to some embodiments of the present application, optionally, as shown in FIG. 4 and FIG. 5, the position-limit boss 15 is disposed around the sealing member 14.

Since the nail body 132 is of a cylindrical structure, in order to ensure the sealing effect of the sealing member 14 (please refer to FIG. 5), the sealing member 14 is of an annular structure, namely, a sealing ring, and the nail body 132 is sleeved with the sealing member 14, so as to achieve the sealing fit between the nail cap 131 and the end cover assembly 12 at any position in the circumferential direction of the nail body 132, and ensure the sealing effect between the nail cap 131 and the end cover assembly 12. The position-limit boss 15 is disposed around the sealing member 14, which means along the radial direction of the rivet 13, the sealing member 14 is closer to the central axis of the rivet 13 than the position-limit boss 15, in other words, the sealing member 14 is located between the position-limit boss 15 and the nail body 132.

In the embodiment where the position-limit boss 15 is formed on the side of the nail cap 131 close to the first hole segment 1201, as shown in FIG. 4, the position-limit boss 15 being disposed around the sealing member 14 may be that the nail cap 131 covers the outside of the sealing member 14. In the embodiment where the position-limit boss 15 is formed on the end cover assembly 12, the position-limit boss 15 being disposed around the sealing member 14 may be that the surface of the position-limit boss 15 facing the nail body 132, the surface of the end cover assembly 12 where the first hole segment 1201 is opened (the first stepped surface 1204), the nail body 132, and the surface of the nail cap 131 that is close to the first hole segment 1201 enclose a region limiting the sealing member 14.

The material of the sealing member 14 may be fluororubber, nitrile butadiene rubber, ethylene propylene diene monomer, silica gel, fluorosilicone rubber, and the like.

The position-limit boss 15 is disposed around the sealing member 14, so that the position-limit boss 15 can support the nail cap 131 at different positions in the circumferential direction of the sealing member 14 to prevent the nail cap 131 from being inclined, so as to control the compression amount of the sealing member 14, thereby ensuring that the compression amounts at different positions of the sealing member 14 are consistent, and ensuring the sealing effect between the nail cap 131 and the end cover assembly 12.

The shape of the position-limit boss 15 can be determined according to the contour of the nail cap 131, so as to achieve the constraint on the sealing member 14, and ensure the sealing effect between the nail cap 131 and the end cover assembly 12.

Figure 6:
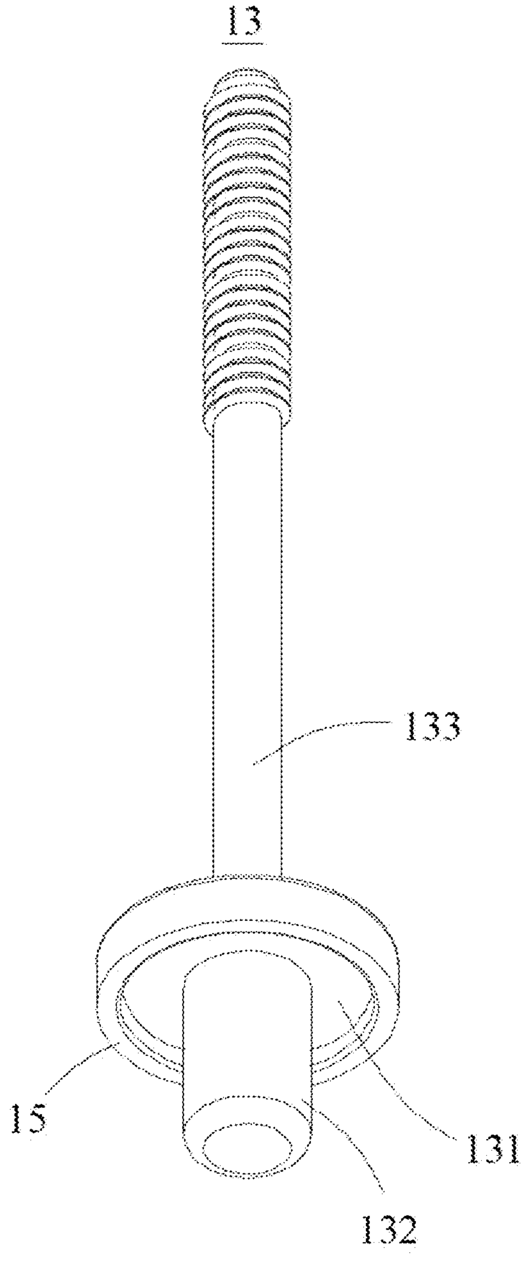
FIG. 6 is a schematic structural diagram of a rivet provided by some embodiments of the present application.
Figure 7:
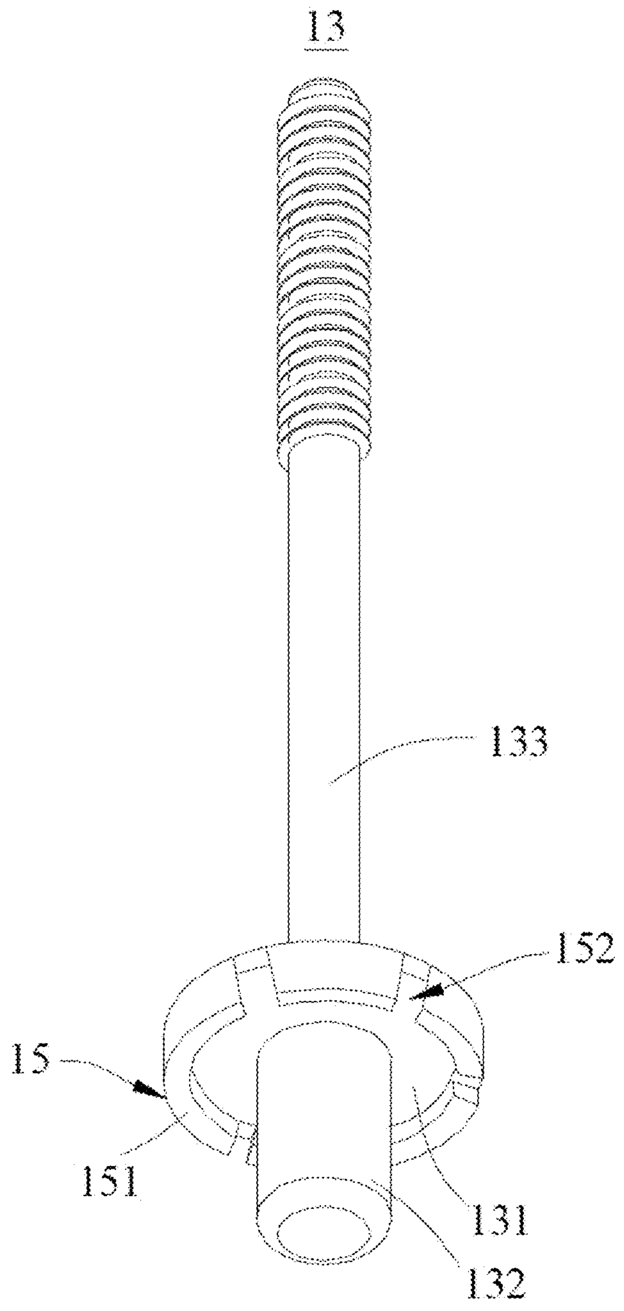
FIG. 7 is a schematic structural diagram of a rivet provided by other embodiments of the present application.

Please refer to FIGS. 6 and 7, FIG. 6 is a schematic structural diagram of a rivet 13 provided by some embodiments of the present application. FIG. 7 is a schematic structural diagram of a rivet 13 provided by other embodiments of the present application. According to some embodiments of the present application, optionally, as shown in FIG. 6, the position-limit boss 15 is an annular boss disposed around the central axis of the rivet 13; or, as shown in FIG. 7, the position-limit boss 15 includes a plurality of sub-bosses 151 distributed at intervals around the central axis of the rivet 13.

Since the nail body 132 is a cylinder, the central axis of the rivet 13 is also the central axis of the nail body 132. The sealing member 14 is of an annular structure, and the nail body 132 is sleeved with the sealing member 14 to facilitate fitting the sealing member 14 with the nail body 132, and ensure the sealing effect between the nail cap 131 and the end cover assembly 12. The contour of the nail cap 131 may be circular so that the nail cap 131 and the sealing member 14 have a large contact area. As shown in FIG. 7, the position-limit boss 15 comprising a plurality of sub-bosses 151 distributed at intervals around the central axis of the rivet 13 may be that, on the basis of the annular boss, opening a plurality of notches 152 at intervals on the annular boss around the central axis of the rivet 13, so that the annular boss is of a discontinuous structure, and a sub-boss 151 is formed between two adjacent notches 152.

In the embodiment where the position-limit boss 15 is an annular boss disposed around the central axis of the rivet 13, the position-limit boss 15 can achieve the effect of supporting at any position in the circumferential direction of the rivet 13, so as to prevent the nail cap 131 from being inclined, and control the compression amount of the sealing member 14, thereby ensuring the compression amounts at different positions of the sealing member 14 are consistent. In the embodiment where the position-limit boss 15 includes a plurality of sub-bosses 151 distributed at intervals around the central axis of the rivet 13, the plurality of sub-bosses 151 can have a plurality of support positions in the circumferential direction of the rivet 13 to prevent the nail cap 131 from being inclined, so as to control the compression amount of the sealing member 14, and ensure that the compression amounts at different positions of the sealing member 14 are consistent.

According to some embodiments of the present application, optionally, as shown in FIG. 6 and FIG. 7, the position-limit boss 15 is formed at the edge of the nail cap 131.

The position-limit boss 15 is formed on the side of the nail cap 131 close to the first hole segment 1201, and is located at the edge of the nail cap 131, and along the radial direction of the rivet 13, the sealing member 14 is located between the position-limit boss 15 and the nail body 132. Compared with other arrangement manners in which the position-limit boss 15 is not disposed at the edge of the nail cap 131, for example, in an arrangement manner that the position-limit boss is disposed on the nail cap 131 close to the central axis of the rivet 13, the position-limit boss being formed at the edge of the nail cap 131 enables the nail cap 131 and the sealing member 14 to have a large contact area, so as to facilitate the control of the compression amount of the sealing member 14, and ensure the sealing effect between the nail cap 131 and the end cover assembly 12.

Figure 8:
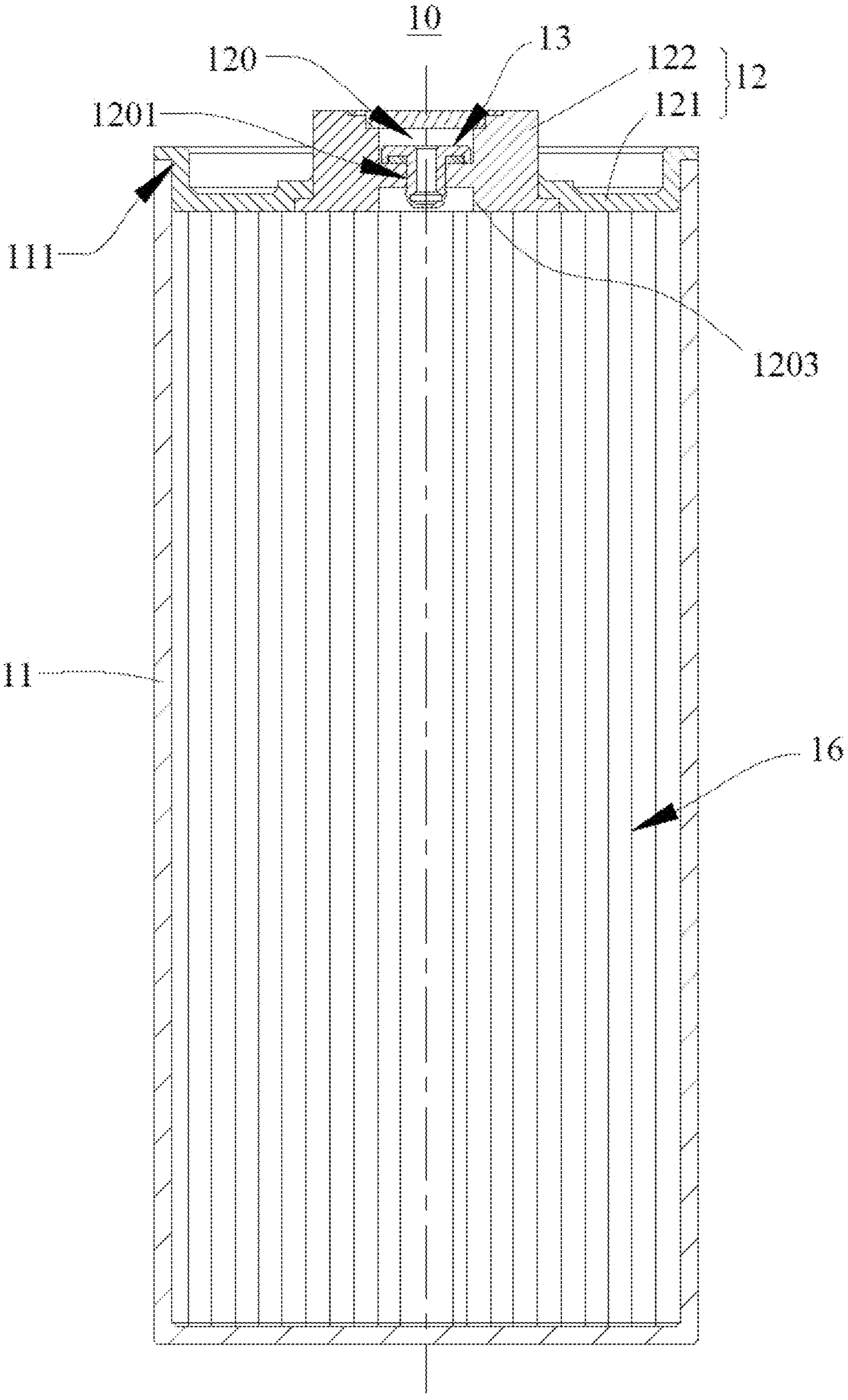
FIG. 8 is a schematic structural diagram of a battery cell provided by other embodiments of the present application.
Figure 9:
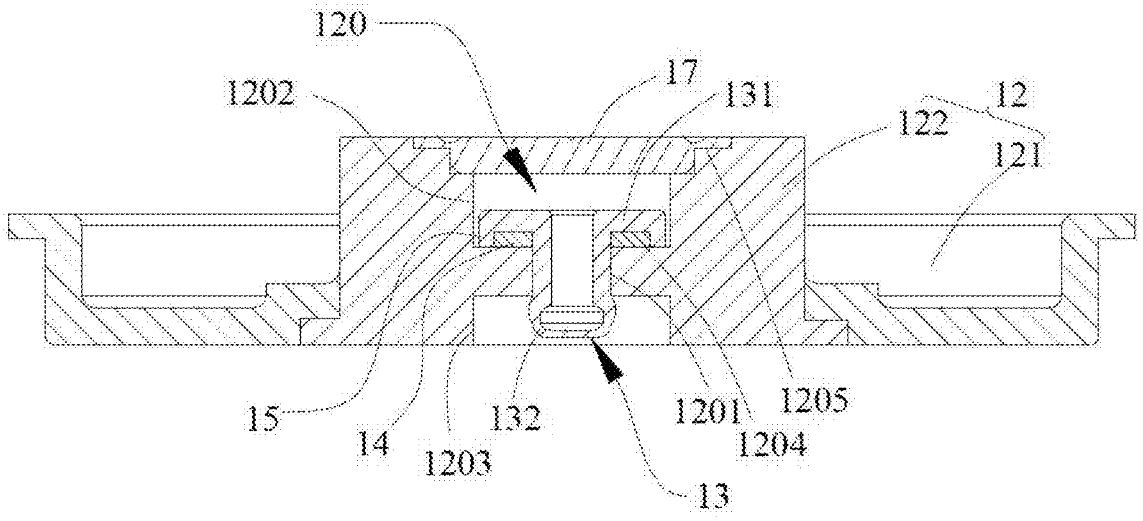
FIG. 9 is a schematic structural diagram of the end cover assembly of FIG. 8.

Please refer to FIGS. 8 and 9. FIG. 8 is a schematic structural diagram of a battery cell provided by some other embodiments of the present application, and FIG. 9 is a schematic structural diagram of the end cover assembly 12 in FIG. 8. According to some embodiments of the present application, optionally, as shown in FIG. 8 and FIG. 9, the end cover assembly 12 includes an end cover 121 and an electrode terminal 122, the end cover 121 covers the opening 111, the electrode terminal 122 is disposed on the end cover 121, and a liquid injection hole 120 is disposed on the end cover 121 or the electrode terminal 122.

The end cover 121 covers the opening 111 and is in sealing connection with the case 11 to close the opening 111 and form a cavity for accommodating the electrode assembly 16. The electrode terminal 122 is disposed on the end cover 121, and the electrode terminal 122 is electrically connected to the tab of the electrode assembly 16 for outputting or inputting electrical energy from or to the battery cell 10.

The liquid injection hole 120 may be disposed on the end cover 121, or may be disposed on the electrode terminal 122. In the embodiment where the liquid injection hole 120 is disposed on the end cover 121, the liquid injection hole 120 may be disposed at any suitable position of the end cover 121, and there are many positions for selection, as long as the liquid injection hole 120 does not interfere with other components; in the embodiment where the liquid injection hole 120 is disposed on the electrode terminal 122, as shown in FIG. 9, the thickness of the electrode terminal 122 is greater than the thickness of the end cover 121, which can provide good support for riveting the rivet 13, so as to facilitate riveting operation.

According to some embodiments of the present application, optionally, as shown in FIG. 9, the liquid injection hole 120 further includes a second hole segment 1202 in communication with the first hole segment 1201, the second hole segment 1202 is located on the side of the first hole segment 1201 away from the interior of the case 11, the battery cell 10 further includes a sealing nail 17, and the sealing nail 17 is in sealing fit with the second hole segment 1202.

The second hole segment 1202 is in communication with the first hole segment 1201 and is located on the side of the first hole segment 1201 away from the interior of the case 11, and the liquid injection hole 120 extends to the side of the first hole segment 1201 away from the interior of the case 11, so as to avoid occupying the internal space of the case 11; the sealing effect is further improved by means of the sealing fit between the sealing nail 17 and the second hole segment 1202, and in the case of failure of the sealing member 14, it can be ensured that the liquid injection hole 120 is still in a sealed state, and the risk of leakage of the electrolyte solution is reduced.

Optionally, the diameter of the second hole segment 1202 is greater than the diameter of the first hole segment 1201, so as to facilitate the mounting of the rivet 13; a first stepped surface 1204 is formed between the second hole segment 1202 and the first hole segment 1201. In order to facilitate mounting and guidance of the rivet 13, the first stepped surface 1204 is provided with a guide portion, and the guide portion may be a chamfer formed at the connection between the first hole segment 1201 and the first stepped surface 1204, so as to guide the nail body 132 into the first hole segment 1201.

Optionally, the sealing nail 17 is an aluminum nail, and the sealing nail 17 is welded with the hole wall of the second hole segment 1202, so as to ensure the connection strength between the sealing nail 17 and the hole wall of the second hole segment 1202, and further ensure the sealing effect between the sealing nail 17 and the second hole segment 1202.

According to some embodiments of the present application, the liquid injection hole 120 is disposed on the end cover 121, and the side of the sealing nail 17 away from the interior of the case 11 does not exceed the side of the end cover 121 away from the interior of the case 11; or, as shown in FIG. 9, the liquid injection hole 120 is disposed on the electrode terminal 122, and the side of the sealing nail 17 away from the interior of the case 11 does not exceed the side of the electrode terminal 122 away from the interior of the case 11.

The side of the sealing nail 17 away from the interior of the case 11 may be the side of the sealing nail 17 away from the electrode assembly 16; the side of the end cover 121 away from the interior of the case 11 may be the side of the end cover 121 away from the electrode assembly 16; the side of the electrode terminal 122 away from the interior of the case 11 may be the side of the electrode terminal 122 away from the electrode assembly 16.

In the embodiment where the liquid injection hole 120 is disposed on the end cover 121, a step recessed toward the first hole segment 1201 is disposed at the opening end of the second hole segment 1202 away from the first hole segment 1201, the sealing nail 17 is disposed on the step to facilitate positioning of the sealing nail 17 on the end cover 121, and the sealing nail 17 is welded and fixed to the end cover 121, so that the outer surface of the sealing nail 17 does not exceed the outer surface of the end cover 121. For example, the outer surface of the sealing nail 17 is flush with the outer surface of the end cover 121, or the outer surface of the sealing nail 17 is closer to the first hole segment 1201 than the outer surface of the end cover 121. In the embodiment where the liquid injection hole 120 is disposed on the electrode terminal 122, as shown in FIG. 9, a recessed step 1205 is disposed at the opening end of the second hole segment 1202 away from the first hole segment 1201, and the sealing nail 17 is disposed on the step 1205 to facilitate positioning of the sealing nail 17 on the electrode terminal 122, and the sealing nail 17 is welded and fixed to the electrode terminal 122, so that the outer surface of the sealing nail 17 is flush with the outer surface of the electrode terminal 122.

In the embodiment where the liquid injection hole 120 is disposed on the end cover 121, the side of the sealing nail 17 away from the interior of the case 11 being flush with the side of the end cover 121 away from the interior of the case 11 may be that the outer surface of the sealing nail 17 is flush with the outer surface of the end cover 121, so that the appearance of the battery cell 10 is beautiful, and the sealing nail 17 can be prevented from protruding from the outer surface of the end cover 121 and interfering with other components. In the embodiment where the liquid injection hole 120 is disposed on the electrode terminal 122, the side of the sealing nail 17 away from the interior of the case 11 being flush with the side of the electrode terminal 122 away from the interior of the case 11 may be that the outer surface of the sealing nail 17 is flush with the outer surface of the electrode terminal 122, so that the appearance of the battery cell 10 is beautiful, and the sealing nail 17 can be prevented from protruding from the outer surface of the electrode terminal 122 and interfering with other components.

According to some embodiments of the present application, optionally, as shown in FIG. 8 and FIG. 9, the liquid injection hole 120 further includes a third hole segment 1203 in communication with the first hole segment 1201, the third hole segment 1203 is located on the side of the first hole segment 1201 close to the interior of the case 11, and the end of the nail body 132 away from the nail cap 131 is located in the third hole segment 1203 and does not exceed the third hole segment 1203.

As shown in FIG. 8, the third hole segment 1203 communicates with the first hole segment 1201 and the interior of the case 11 to facilitate the flow of electrolyte solution into the interior of the case 11 via the first hole segment 1201 and the third hole segment 1203. After the nail body 132 passes through the first hole segment 1201, the end of the nail body 132 away from the nail cap 131 is located in the third hole segment 1203, and the end face of the end of the nail body 132 away from the nail cap 131 is flush with the end face of the end of the third hole segment 1203 away from the first hole segment 1201, or the end face of the end of the nail body 132 away from the nail cap 131 is closer to the first hole segment 1201 than the end face of the end of the third hole segment 1203 away from the first hole segment 1201, that is, the end of the nail body 132 away from the nail cap 131 is located in the third hole segment 1203.

The third hole segment 1203 is located on the side of the first hole segment 1201 close to the interior of the case 11, that is, the third hole segment 1203 is closer to the electrode assembly 16 than the first hole segment 1201; in the embodiment where the liquid injection hole 120 is disposed on the end cover 121, the third hole segment 1203 is located on the side of the end cover 121 close to the electrode assembly 16, and the end of the nail body 132 away from the nail cap 131 does not exceed the third hole segment 1203, so as to avoid occupying the internal space of the case 11, thereby improving the energy density of the battery cell 10; in the embodiment where the liquid injection hole 120 is disposed on the electrode terminal 122, the third hole segment 1203 is located on the side of the electrode terminal 122 close to the electrode assembly 16, and the end of the nail body 132 away from the nail cap 131 does not exceed the third hole segment 1203, so as to avoid occupying the internal space of the case 11, thereby improving the energy density of the battery cell 10.

It should be noted that, in the embodiment of the present application, after the riveting is completed, the end of the nail body 132 away from the nail cap 131 does not exceed the third hole segment 1203, and before the rivet 13 is riveted to the end cover assembly 12, the end of the nail body 132 away from the nail cap 131 does not exceed the third hole segment 1203, so as to prevent the nail body 132 from exceeding the third hole segment 1203 and occupying the internal space of the case 11, thereby affecting the energy density of the battery cell 10.

In any of the above embodiments, the liquid injection hole 120 may include a third hole segment 1203, and the end of the nail body 132 away from the nail cap 131 is located in the third hole segment 1203 and does not exceed the third hole segment 1203.

According to some embodiments of the present application, a battery 100 is further provided, including the battery cell 10 in any one of the solutions above.

According to some embodiments of the present application, an electrical apparatus is further provided, including the battery 100 in any one of the solutions above, and the battery 100 is used to provide electric energy for the electrical apparatus.

The electrical apparatus may be any of the aforementioned apparatus or system that use the battery 100.

According to some embodiments of the present application, a cylindrical battery is provided. As shown in FIG. 8 and FIG. 9, a case 11 has an opening 111, an end cover 121 covers the opening 111, an electrode terminal 122 is disposed on the end cover 121, a tab of the electrode assembly 16 is electrically connected to the electrode terminal 122, and the electrode terminal 122 is provided with a liquid injection hole 120. The liquid injection hole 120 includes a second hole segment 1202, a first hole segment 1201, and a third hole segment 1203 that are communicated in sequence, and the third hole segment 1203 is closer to the electrode assembly 16 than the first hole segment 1201. The rivet 13 comprises a nail cap 131 and a nail body 132, the nail cap 131 is located in the second hole segment 1202, the nail body 132 is connected to the side of the nail cap 131 close to the first hole segment 1201, the nail body 132 extends into the third hole segment 1203 after passing through the first hole segment 1201, and the end of the nail body 132 away from the nail cap 131 is located in the third hole segment 1203 and does not exceed the third hole segment 1203. The sealing member 14 is disposed between the nail cap 131 and the electrode terminal 122, the position-limit boss 15 is formed on the side of the nail cap 131 close to the first hole segment 1201, and the position-limit boss 15 is formed at the edge of the nail cap 131, and the position-limit boss 15 is an annular boss disposed around the central axis of the rivet 13. The position-limit boss 15 abuts against the electrode terminal 122, and is configured to control the compression amount of the sealing member 14, so as to ensure that the compression amounts at different positions of the sealing member 14 are consistent, and ensure the sealing effect between the nail cap 131 and the end cover assembly 12. After the rivet 13 being riveted to the electrode terminal 122, a sealing nail 17 is disposed at the opening of the second hole segment 1202 away from the first hole segment 1201, the sealing nail 17 is welded with the electrode terminal 122 to seal the second hole segment 1202, and the side of the sealing nail 17 away from the interior of the case 11 is flush with the side of the electrode terminal 122 away from the interior of the case 11.

While the present application has been described with reference to the preferred embodiments, various modifications may be made and components therein may be replaced with equivalents without departing from the scope of the present application. In particular, the technical features mentioned in the various examples can be combined in any manner as long as there is no structural conflict. The present application is not limited to the specific embodiments disclosed herein, but rather includes all technical solutions falling within the scope of the claims.

The invention claimed is:

1. A battery cell comprising:

a case having an opening;

an end cover assembly for closing the opening, wherein the end cover assembly is provided with a liquid injection hole, and the liquid injection hole includes a first hole segment;

a rivet, comprising a nail cap and a nail body, wherein the nail body passes through the first hole segment, and the nail cap is located on the side of the first hole segment away from the interior of the case; and a sealer, arranged between the nail cap and the end cover assembly, for sealing the first hole segment;

wherein a position-limit boss is formed on the side of the nail cap closer to the first hole segment, and the position-limit boss is configured to abut against the end cover assembly to limit the compression amount of the sealer; or, a position-limit boss is formed on the end cover assembly, and the position-limit boss abuts against the side of the nail cap closer to the first hole segment to limit the compression amount of the sealer, the position-limit boss is formed at an edge of the nail cap, and in a direction perpendicular to the outer surface of the nail body, a width of the position-limit boss is smaller than a width of a space between a surface of the position-limit boss and an outer surface of the nail body, and the end cover assembly comprises an end cover and an electrode terminal, the end cover covers the opening, the electrode terminal is disposed on the end cover, and the liquid injection hole is disposed on the electrode terminal.

2. The battery cell according to claim 1, wherein a height of the position-limit boss is less than an original thickness of the sealer.

3. The battery cell according to claim 1, wherein the position-limit boss is disposed around the sealer.

4. The battery cell according to claim 1, wherein the position-limit boss is an annular boss disposed around a central axis of the rivet; or, the position-limit boss comprises a plurality of sub-bosses distributed at intervals around a central axis of the rivet.

5. The battery cell according to claim 1, wherein the liquid injection hole further comprises a second hole segment in communication with the first hole segment, the second hole segment is located on the side of the first hole segment away from the interior of the case, the battery cell further comprises a sealing nail, and the sealing nail is in sealing fit with the second hole segment.

6. The battery cell according to claim 5, wherein the liquid injection hole is disposed on the end cover, and the side of the sealing nail away from the interior of the case does not exceed the side of the end cover away from the interior of the case;

or, the liquid injection hole is disposed on the electrode terminal, and the side of the sealing nail away from the interior of the case does not exceed the side of the electrode terminal away from the interior of the case.

7. The battery cell according to claim 1, wherein the liquid injection hole further comprises a third hole segment in communication with the first hole segment, the third hole segment is located on the side of the first hole segment closer to the interior of the case, and the end of the nail body away from the nail cap is located in the third hole segment and does not exceed the third hole segment.

8. A battery comprising the battery cell of claim 1.

9. An electrical apparatus comprising the battery of claim 8, wherein the battery is configured to provide electric energy.

10. The battery cell according to claim 7, wherein a diameter of the third hole segment is greater than a diameter of the first hole segment.

* * * * *